Figure 4:
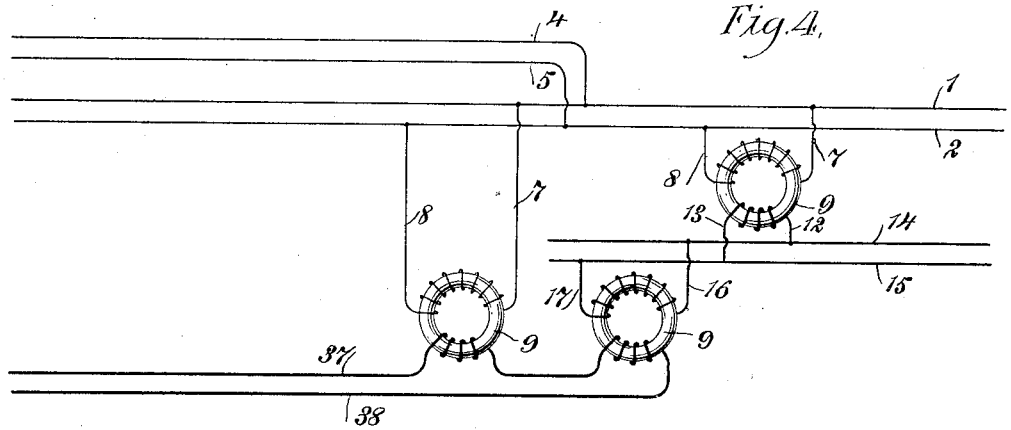

No. 700,079. Patented May 13, 1902.
R. A. PHILIP.
POTENTIAL REGULATOR.
(Application filed Nov. 5, 1901.)
(No Model.) 2 Sheets—Sheet 1.
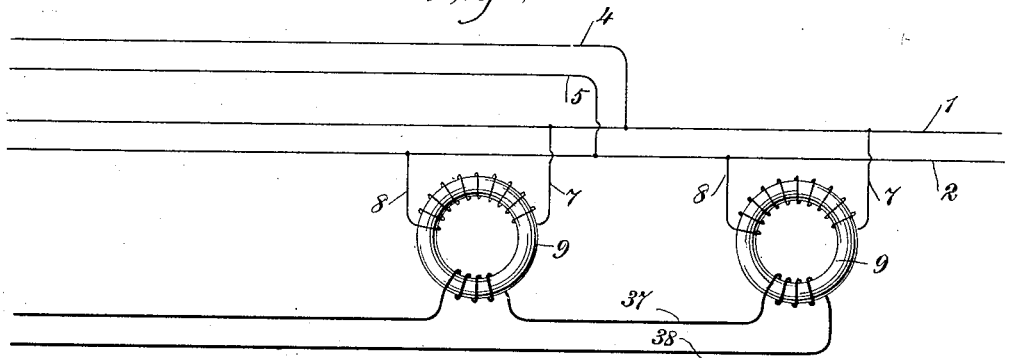
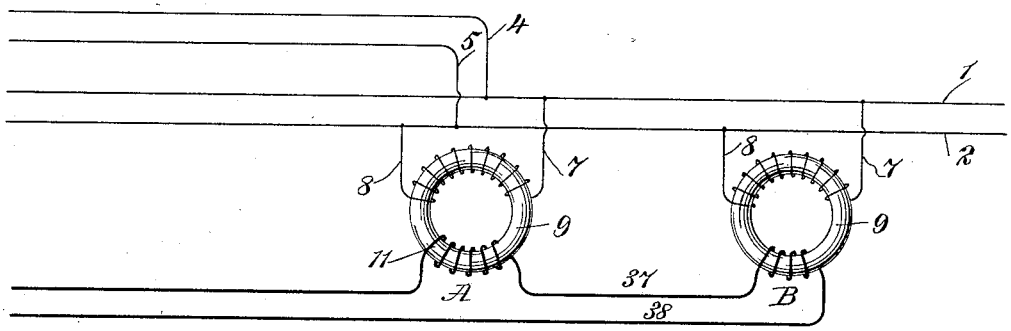
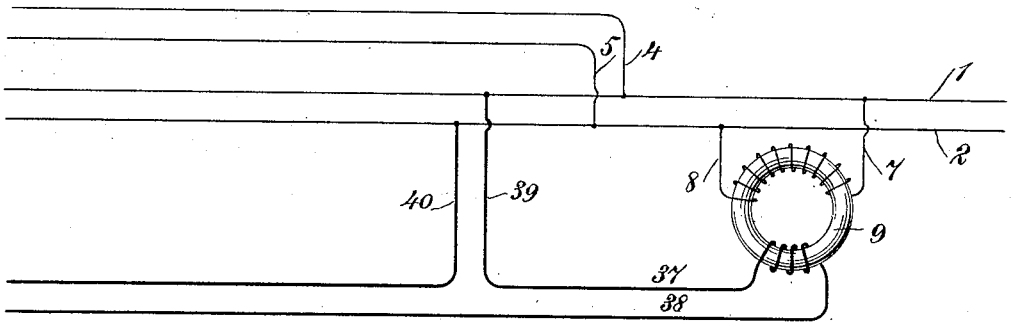
WITNESSES:
Edward Thorpe
Walton Harrison
INVENTOR
Robert A. Philip
BY
ATTORNEYS No. 700,079. Patented May 13, 1902.
R. A. PHILIP.
POTENTIAL REGULATOR.
(Application filed Nov. 5, 1901.)

(No Model.) 2 Sheets—Sheet 2.

WITNESSES:
Edward Thorpe
Walton Harrison

INVENTOR
Robert A. Philip
BY
ATTORNEYS

UNITED STATES PATENT OFFICE.

ROBERT ASHBY PHILIP, OF SEATTLE, WASHINGTON.

POTENTIAL-REGULATOR.

SPECIFICATION forming part of Letters Patent No. 700,079, dated May 13, 1902.

Application filed November 5, 1901. Serial No. 81,186. (No model.)

*To all whom it may concern:*

Be it known that I, ROBERT ASHBY PHILIP, a citizen of the United States, and a resident of Seattle, in the county of King and State of Washington, have invented a new and Improved Potential-Regulator, of which the following is a full, clear, and exact description.

My invention relates to potential-regulators of the kind comprising a general system for use upon large circuits — for instance, in cities—and where it is desirable to keep the potential as near constant as possible in order that the same may be adapted to the needs of the apparatus connected to the mains.

In a constant-potential circuit for the distribution of electricity it is impossible to keep all of the mains at the same constant potential, yet it is desirable to keep the average potential as near constant as possible. The customary way of doing this is to select some particular point which is assumed to be a fair representative of the average condition of the circuit and to run pilot-wires back from the point thus selected to the station, where the current brought by the pilot-wires actuates an indicating device, such as a voltmeter, or a regulating instrument. Where this method is used, it is practically impossible to select any one point which may justly be assumed to represent the average potential of the circuit. If several points are selected on the mains of the same feeder and pilot-wires run back from the several points to the station, the complexity and cost of the system is greatly increased, and since the regulation can be done according to the voltage indicated by only one set of pilot-wires at a time an uncertainty is introduced as to the proper set or group of pilot-wires to be chosen.

My invention is for the purpose of modifying the voltage returned to the station by a group of pilot-wires in such a way that instead of representing the potential at some particular point of the system the voltage indicated is proportionate to the average potential at two or more points of the system. This minimizes the liability of the general potential of the system being injuriously affected by local disturbances. I accomplish this result by properly connecting one or more potential-transformers to the system in a particular way.

Having selected two or more points the average potential of which is assumed to be fairly representative of the average potential of the system, as above indicated, I connect the primary coil of the potential-transformer to the mains of the system at each of said points and arrange the secondary coils of these transformers in series and connect the terminals thereof to the pilot-wires. The potential of the pilot-wires is thus made representative of the average of the several potentials of the system at the different points selected.

In the accompanying drawings like numerals indicate like parts in all the views.

Figure 5:
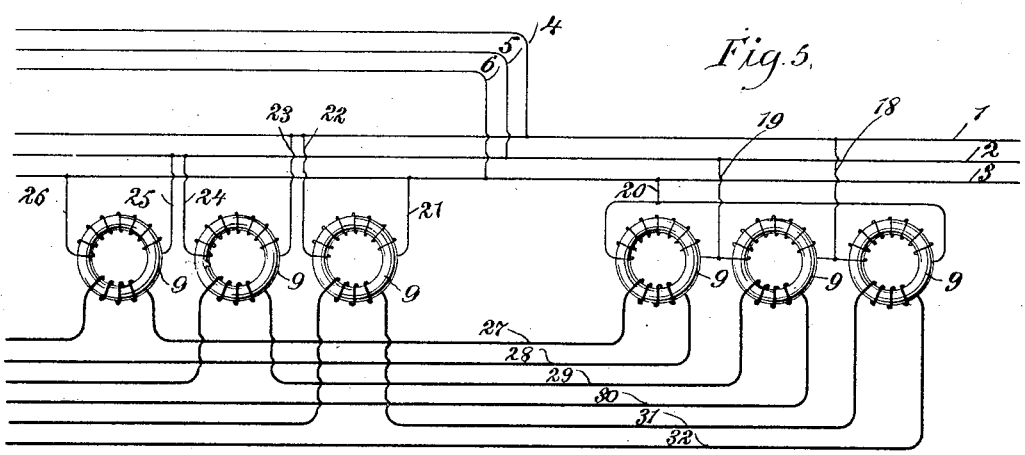

Figure 1 shows a pair of potential-transformers as connected to the mains and the pilot-wires for use in my system. Fig. 2 shows the transformers as having substantially different determining power for modifying the effect of each other. Fig. 3 shows the pilot-wires as connected both to the secondary circuit of the transformers and to the mains. Fig. 4 shows two of the transformers with their secondary coils connected to the pilot-wires and their primary coils actuated by a composite circuit connected with primary and secondary mains. Fig. 5 shows polyphase groups of single-phase transformers for use in my system, and Fig. 6 shows my system as used with continuous-current transformers.

In Figs. 1, 2, 3, and 4 the apparatus is adapted for use with single-phase alternating currents.

In Fig. 5 the apparatus is designed for use with polyphase alternating currents.

Figure 6:
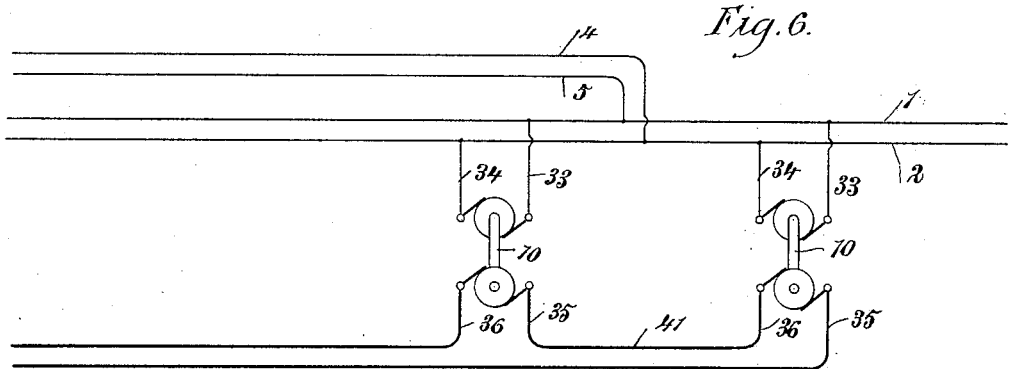

In Fig. 6 the system is shown as applied to continuous currents.

The mains are shown at 1 2 in Figs. 1, 2, 3, 4, and 6 and at 1 2 3 in Fig. 5. The feeders are shown at 4 5 in Figs. 1, 2, 3, 4, and 6 and at 4 5 6 in Fig. 5.

In Figs. 1 and 2 the primary coils of the potential transformers 9 are connected directly to the mains 1 and 2, and the secondary coils of said transformers are arranged in series and connected with the pilot-wires 37 38.

In Fig. 4 there are three transformers, two of which have their secondary coils arranged in series and connected with the pilot-wires 37 38, the other having its secondary coil connected with the secondary mains 14 and 15 by means of the wires 12 13, which are in turn connected with the primary coil of one of these transformers by means of the wires 16 and 17. The wires 7 8 are used to connect the mains with certain primary coils, as shown.

In Fig. 5 the polyphase mains 1 2 3 are connected at 18, 19, 20, 21, 22, 23, 24, 25, and 26 with the primary circuits of the six potential-transformers, as shown. The pairs of wires 27 and 28, 29 and 30, and 31 and 32 comprise a set of pilot-wires. By this arrangement my system can be used with polyphase currents, the principle being that the pilot-wires report the general average of potential in the entire group of single-phase transformers.

In Fig. 6 the mains 1 2 are connected in multiple by wires 33 34 with the motor members of rotary transformers 10, the generator members thereof being connected in series with wires 35 36, which run to the pilot-wires 41 42. By this means the rotary transformers are actuated from the mains and the pilot-wires indicate the average pressure between the several points, thus enabling the potential of continuous-current circuits to be averaged by my system. Where primary and secondary mains are used, as indicated in Fig. 4, the primary mains 1 2 may actuate one of the transformers connected with the pilot-wires and the secondary mains 14 15 actuate the other transformers connected to said pilot-wires, so that the potential reported by the pilot-wires is proportional to a mean between the pressure of the primary and the secondary mains.

If desired, different points selected in the general system may have different weights in determining the average potential. Fig. 2 shows a case in which the point A has twice the determining power on the regulation that the point B has. This is accomplished by placing transformers of different ratios at different selected points in the general system. In the example shown the secondary circuit 11 is wound with more wire than the other secondary circuits.

If desired, the mains and pilot-wires may be connected to the primary and secondary coils of the transformer, and by means of shunt-wires the mains may be connected directly to said pilot-wires, so that one of the components entering into the general average of the potential to be measured is furnished by the shunt-wire. This arrangement is shown in Fig. 3, in which the shunt-wires are designated 39 and 40.

Having thus described my invention, I claim as new and desire to secure by Letters Patent—

1. A system of the kind described, comprising mains, pilot-wires and potential-transformers, said potential-transformers having primary circuits arranged in multiple arc and connected with said mains, and having secondary circuits arranged in series and connected with said pilot-wires.

2. A system of the kind described, comprising mains, pilot-wires and potential-transformers, said potential-transformers being arranged in multiple arc and connected with said mains, and having secondary circuits arranged in series and connected with said pilot-wires, the primary and secondary coils of one transformer having a ratio of potential differing from those of another transformer for the purpose of modifying the mean potential of both of said transformers.

3. A system of the kind described, comprising mains, pilot-wires, potential-transformers and shunt-wires, said potential-transformers having primary circuits connected with said mains, secondary circuits connected with said pilot-wires, and said shunt-wires directly connecting said mains and said pilot-wires, the potential of said shunt-circuit thus formed being a component of the potential reported by said pilot-wires.

4. A system of the kind described, comprising pilot-wires, potential-transformers, and primary and secondary mains, some of said transformers having their secondary circuits arranged in series and connected with said pilot-wires, their primary circuits being arranged in multiple arc and connected to said primary mains and also to the said secondary mains, said secondary mains being in turn connected to the secondary coil of another of said transformers, the primary coil of which is connected to said primary mains.

5. A system of the kind described, comprising mains, pilot-wires, transformers provided with primary and secondary coils, said primary coils being connected in parallel with said mains for the purpose of averaging the potential thereof, said pilot-wires being connected with said secondary coils for reporting a potential proportionate to the average voltage of said primary coil.

6. A system of the kind described, comprising pilot-wires, transformers provided with primary and secondary coils, said primary coils being connected in parallel with said mains, and means connected with said secondary coils for indicating various degrees of potentials proportionate to the average potentials of said primary coils.

In testimony whereof I have signed my name to this specification in the presence of two witnesses.

ROBERT ASHBY PHILIP.

Witnesses:
JAMES D. BLACKWELL,
EDWARD W. CRESSMAN.